United States Patent
Guo

(10) Patent No.: US 9,344,913 B2
(45) Date of Patent: May 17, 2016

(54) WIRELESS NETWORK ENCODING MANAGEMENT METHOD AND SYSTEM

(75) Inventor: Xin Guo, Beijing (CN)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 14/234,716

(22) PCT Filed: Aug. 16, 2012

(86) PCT No.: PCT/CN2012/080224
§ 371 (c)(1),
(2), (4) Date: Jan. 24, 2014

(87) PCT Pub. No.: WO2013/029470
PCT Pub. Date: Mar. 7, 2013

(65) Prior Publication Data
US 2014/0192650 A1  Jul. 10, 2014

(30) Foreign Application Priority Data

Aug. 31, 2011 (CN) .......................... 2011 1 0270416

(51) Int. Cl.
*H04W 28/02* (2009.01)
*H04L 1/00* (2006.01)
*H04W 16/14* (2009.01)

(52) U.S. Cl.
CPC ......... *H04W 28/0289* (2013.01); *H04L 1/0076* (2013.01); *H04L 2001/0097* (2013.01); *H04W 16/14* (2013.01)

(58) Field of Classification Search
CPC ................ H04L 1/0026; H04L 1/0001; H04L 2001/0097; H04L 12/66; H04B 7/15521; H04B 7/18523; H04W 72/02; H04W 72/0413; H04W 72/085; H04W 28/0236; H04J 3/0638
See application file for complete search history.

(56) References Cited

U.S. PATENT DOCUMENTS

| 6,115,580 | A  | * | 9/2000  | Chuprun et al. ................... 455/1 |
| 8,773,975 | B2 | * | 7/2014  | Sun ............................... 370/216 |
| 2007/0206525 | A1 | * | 9/2007  | Miller et al. ................... 370/321 |
| 2007/0280233 | A1 | * | 12/2007 | Bush ............................. 370/390 |
| 2008/0075080 | A1 | * | 3/2008  | Katabi et al. .................. 370/392 |

(Continued)

FOREIGN PATENT DOCUMENTS

| CN | 101325549 A | 12/2008 |
| CN | 101360042 A | 2/2009  |

(Continued)

OTHER PUBLICATIONS

International Search Report issued Nov. 29, 2012 in PCT/CN2012/080224 filed Aug. 16, 2012.

*Primary Examiner* — Jung-Jen Liu
(74) *Attorney, Agent, or Firm* — Oblon, McClelland, Maier Neustadt, L.L.P.

(57) ABSTRACT

A wireless network encoding management method and device. The method includes: determining whether a network infrastructure allows inter-network wireless network encoding; if the inter-network wireless network encoding is allowed, selecting, from neighboring networks of the network infrastructure, a node capable of forming an inter-network wireless network encoding group; and forming the inter-network wireless network encoding group and performing a scheduling design. Therefore, network encoding management in heterogeneous networks can be implemented, and the system capacity of the network and an effective data rate can be increased.

20 Claims, 13 Drawing Sheets

(56) References Cited

U.S. PATENT DOCUMENTS

| | | | |
|---|---|---|---|
| 2008/0267071 A1* | 10/2008 | Voigt et al. | 370/236 |
| 2008/0273541 A1* | 11/2008 | Pharn | 370/400 |
| 2009/0073914 A1* | 3/2009 | Sun et al. | 370/315 |
| 2009/0141631 A1* | 6/2009 | Kim et al. | 370/235 |
| 2009/0154481 A1* | 6/2009 | Han et al. | 370/406 |
| 2011/0026429 A1* | 2/2011 | Ben Slimane et al. | 370/252 |
| 2011/0164621 A1* | 7/2011 | Lee et al. | 370/400 |
| 2011/0176408 A1* | 7/2011 | Sun | 370/216 |
| 2011/0258322 A1* | 10/2011 | Luzzatti et al. | 709/226 |

FOREIGN PATENT DOCUMENTS

| | | |
|---|---|---|
| CN | 102098149 A | 6/2011 |
| KR | 2009 0093645 A | 9/2009 |

* cited by examiner

WIRELESS NETWORK ENCODING MANAGEMENT METHOD AND SYSTEM

THE CROSS REFERENCE OF RELEVANT APPLICATION

The application requests the priority right based on the Chinese patent application 201110270416.1 filed in State Intellectual Patent Office on Aug. 31, 2011 with the title of "wireless network encoding management method and system", and incorporates all the contents thereof by reference.

FIELD

The disclosure generally relates to the field of communications and in particular to methods and systems of managing wireless network coding.

BACKGROUND

With the increasing of user requirements for wireless multimedia services, limited wireless resources are becoming more and more insufficient, which promotes the fast development of the communication technologies on efficient utilization of the wireless resources. The birth of 3G, B3G, and 4G standards brings along the proposals of various advanced wireless techniques, which makes the spectrum efficiency per link approach a theoretical limit. In such a case, the study of resource utilization turns to the increasing of the spectrum efficiency per area unit. Thus the network planning in system level is becoming more and more important.

For example, LTE Advanced standard introduces a heterogeneous network which includes a macro base station, a micro base station, a femto base station and a relay base station, and the like. Such a hybrid networking manner is flexible, convenient and economic, and ensures the wireless users to obtain a consistent user experience wherever they are. Moreover, an organization or person may establish various wireless networks as required, in addition to communication networks, which increases the complexity of the heterogeneous network.

The heterogeneous network has abundant meaning in various aspects such as wireless techniques, coverage ranges, network architecture and network performance; and forms a three-dimensional geographic coverage. On one hand, the increasing of number of infrastructure nodes in the network topology may shorten the distance of the user access links, improve the link quality and thus increase the network capacity. On the other hand, the addition of relay stations which performs the forwarding function may result in the repeated data transmission and thus reduce the effective data rate in the network.

To improve the effective data rate in the heterogeneous network, network coding technique is introduced in the heterogeneous network, which may improve both the system capacity and the effective data rate via multi-point coordination.

The network coding technique may be a super set of routing techniques, which allows for the coding and combination of the information from different links. The network node can perform both the routing function and the coding function so that the network approaches the limit of maximum stream transmission.

In the scenario of the heterogeneous network, since some of the infrastructure in heterogeneous network is mobile, the employed wireless technique may be reconfigured according to the application environment and the user distribution and bandwidth requirements change dynamically during the network operation. In this case, the management of network coding is becoming important.

SUMMARY

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

Some embodiments of the disclosure provide a method and system for managing wireless network coding, which are capable of the management of network coding in a heterogeneous network and thus improve both the system capacity and the effective data rate of the network.

According to an aspect of the disclosure, there is provided a method for managing wireless network coding. The method may include: determining whether a network infrastructure allows for wireless network coding between networks; if yes, selecting, from a neighbor network of the network infrastructure, nodes usable to constitute an inter-network wireless network coding group; and forming the inter-network wireless network coding group and performing a schedule design.

According to another aspect of the disclosure, there is provided a device for managing wireless network coding. The device may include: a determining section, configured to determine whether a network infrastructure allows for wireless network coding between networks; a selecting section, configured to selecting, from a neighbor network of the network infrastructure, nodes usable to constitute an inter-network wireless network coding group if the wireless network coding between networks is allowed; and an inter-network wireless network coding group forming section, configured to form the inter-network wireless network coding group perform a schedule design.

According to other aspects of the disclosure, there are provided corresponding computer program code, computer readable storage medium and computer program product.

The above and other objects, features and advantages of the embodiments of the disclosure can be better understood with reference to the description given below in conjunction with the accompanying drawings

BRIEF DESCRIPTION OF DRAWINGS

The disclosure can be better understood with reference to the description given below in conjunction with the accompanying drawings, throughout which identical or like components are denoted by identical or like reference signs. The drawings, together with the following detailed description, form part of the disclosure and merely to illustrate some preferred embodiments and the principle of the disclosure. In the drawings.

DETAILED DESCRIPTION

Some embodiments of the present disclosure will be described in conjunction with the accompanying drawings hereinafter. For clarity and conciseness, not all the features in the actual implementations are described. However, it should be appreciated that, during the developing of any such actual implementation, it may be necessary to make many decisions that are specific to the implementation, in order to achieve a particular object of the technicians, for example, to comply with those limitations related to system and service. Such limitations may changes in different implementations. In addition, it should also be appreciated that, though such developing may be complex and time consuming, it is merely a routine task for those skilled in the art that get benefit from the disclosure.

It should be further noted that some details regarding some components and/or processes irrelevant to the disclosure or well known in the art are omitted for the sake of clarity and conciseness.

Figure 1:
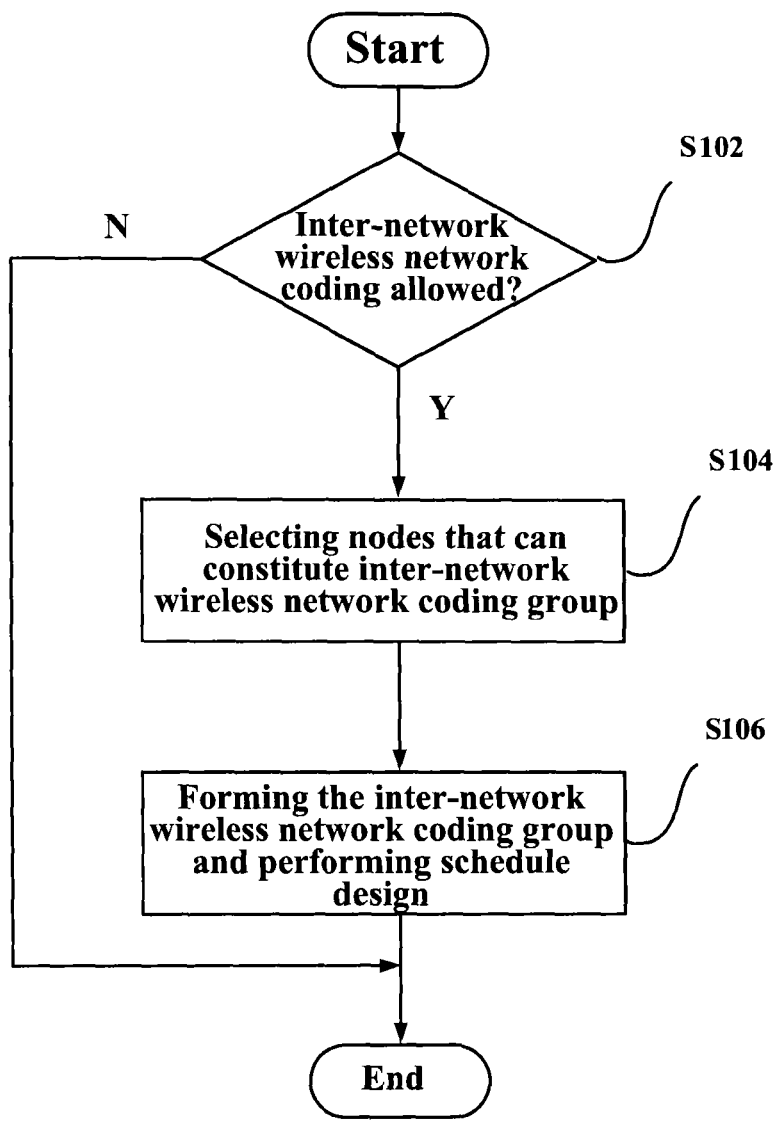
FIG. 1 is a schematic diagram illustrating a method of managing wireless network coding according to an embodiment of the disclosure.

FIG. 1 is a schematic diagram illustrating a method of managing wireless network coding according to an embodiment of the disclosure.

As shown in FIG. 1, at step S102, it is determined whether a network infrastructure allows for wireless network coding between networks.

Figure 17:
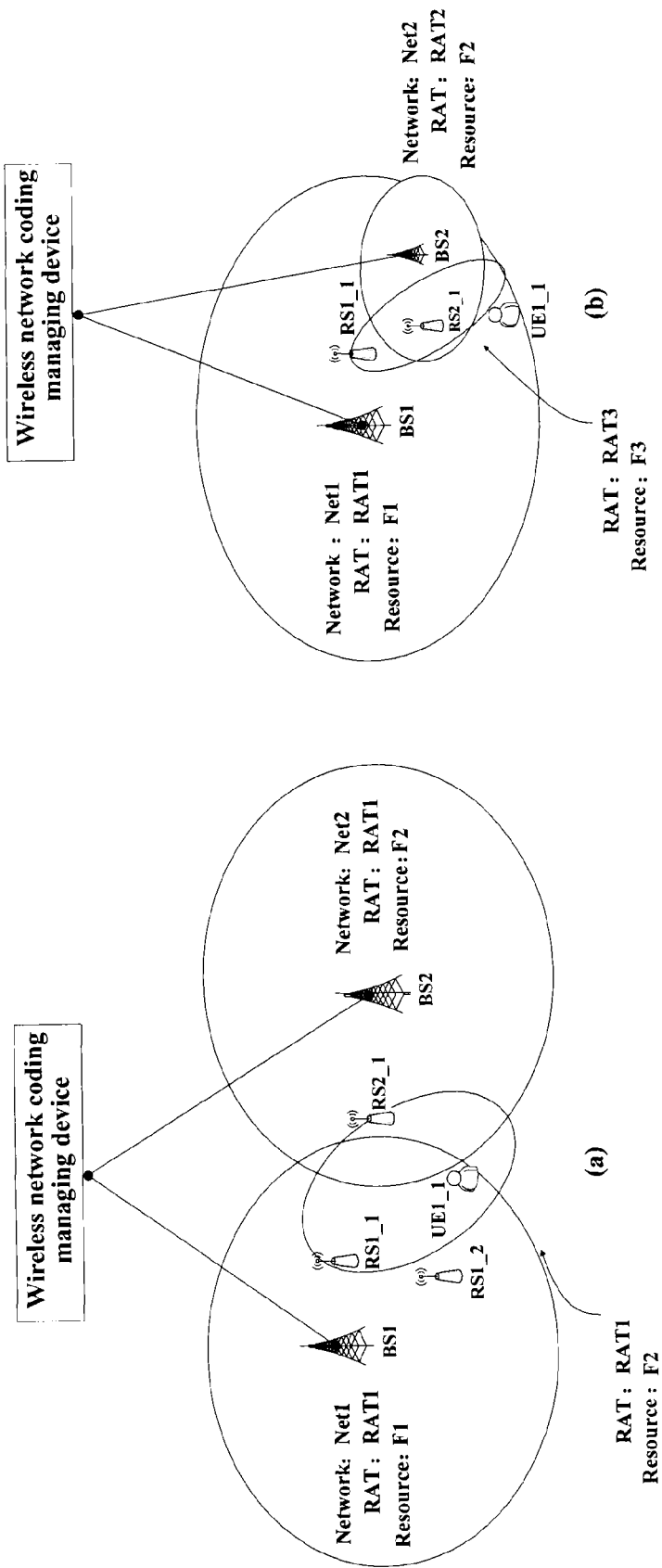
FIG. 17 is a schematic diagram illustrating inter-network wireless network coding according to the embodiment of the disclosure.

The wireless network coding between networks refers to the case that the nodes of a networking coding group are from a plurality of networks. FIG. 17 is a schematic diagram illustrating the wireless network coding between networks according to an embodiment of the disclosure. As shown in FIG. 17, the nodes of a network coding group which is denoted by a dotted line come from two networks, i.e. Net1 and Net2. As shown in FIG. 17(a), the network Net1 employs wireless technique RAT1 and resource F1, the previous network coding group of the base station BS1 includes the relay stations RS1_1 and RS1_2, and the terminal UE1_1. The network Net2 employs wireless technique RAT1 and resource F2, the previous network coding group of the base station BS2 includes the relay station RS2_1. If at this time the relay station RS1_2 provides service to other users in Net1 except UE1_1, RS2_1 in Net2 is idle, and RS1_1 and UE1_1 may use F2, the network coding group may be reselected to include RS1_1, RS2_1 and UE1_1 using RAT1 and F2 for transmission, so that the group may operate at the same time with the other transmissions in Net1. As shown in FIG. 17(b), the user UE1_1 in Net1 is at the edge of the cell and is distant from both the base station BSI and the relay station RS1_1, which causes a low signal quality. The network Net2 is arranged between RS1_1 and UE1_1, and RS2_1 is idle. If these 3 nodes may be configured as employing RAT3 and F3, the network coding group formed by these 3 nodes may operate at the same time with other transmissions in Net1 and Net2.

Referring back to FIG. 1, in particular, whether the network infrastructure allows for wireless network coding between networks may be determined based on the current load status of the network infrastructure. For example, if the load of the network infrastructure is low or the network infrastructure is idle for a long period, the wireless network coding between networks may be allowed, otherwise, the wireless network coding between networks is not allowed. The network infrastructure may be a base station in the communication network, such as a macro base station, a micro base station, a femto base station and a relay base station.

As shown in FIG. 1, if it is determined that wireless network coding between networks is allowed at step S102, then in step S104 the nodes that may constitute an inter-network wireless network coding group with the network infrastructure may be selected from the neighbor networks of the network infrastructure.

In particular, some nodes that may bring about the reduction in the data rate or communication quality of the network (for example, the nodes having a low link quality, and/or the nodes with a heavy load, etc.) may be selected from the neighbor networks of the network infrastructure, to form the inter-network wireless network coding group, so as to improve the system capacity and the effective data rate.

Next, at step S106, the inter-network wireless network coding group is formed and a schedule design may be performed.

In particular, the nodes selected in step S104, together with the network infrastructure, may form the inter-network wireless network coding group, and a resource scheduling scheme may be designed for the wireless network coding group.

In this way, the method of managing wireless network coding according to the embodiment is performed. In this method, an inter-network wireless network coding group may be formed between networks, and thus the system capacity and the effective data rate may be improved.

In an embodiment of the disclosure, whether the network infrastructure allows for wireless network coding between networks may be determined according to the load status of network infrastructure.

Figure 2:
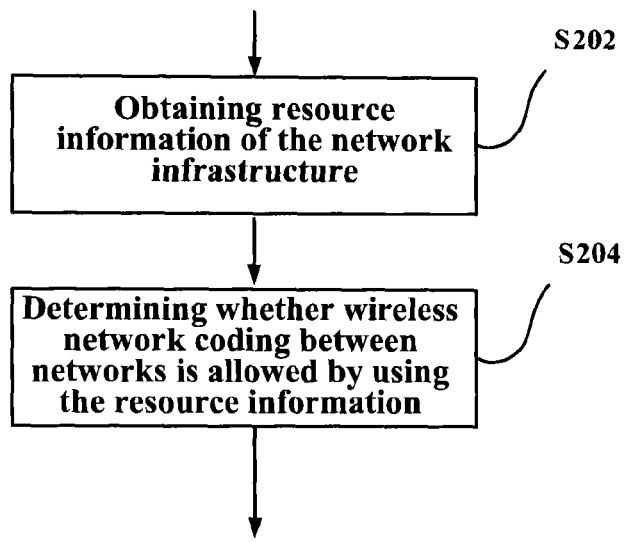
FIG. 2 is a schematic diagram illustrating a process of determining whether a network infrastructure allows for wireless network coding between networks according to an embodiment of the disclosure.

FIG. 2 is a flow chart illustrating a process of determining whether the network infrastructure allows for wireless network coding between networks according to an embodiment of the disclosure.

As shown in FIG. 2, at step S202, the resource information of the network infrastructure may be obtained.

In particular, the resource information of the network infrastructure may include the information indicating the maximum load amount at present and within a following time period, such as, the idle time period of the network infrastructure, the consecutive average load amount of the network infrastructure, and/or the prospect load amount of the network infrastructure. In addition, in another embodiment of the disclosure, the resource information of the network infrastructure may further include the information associated with the spectrum resources occupied by the network infrastructure and the wireless technology employed by the network infrastructure.

Next, at step S204, whether the network infrastructure allows for wireless network coding between networks may be determined by using the resource information of the network infrastructure.

In a particular embodiment, the consecutive idle time period of the network infrastructure may be obtain by using the resource information of the network infrastructure. And if the consecutive idle time period exceeds a first threshold value, it is determined that the wireless network coding between networks is allowed. The first threshold value may be set according to experience or may be set according to the actual application scenario.

In another particular embodiment, the maximum load amount within a following time period may also be obtained by using the resource information of the network infrastructure. If the maximum load amount is less than a second threshold value, it may be determined that the wireless network coding between networks is allowed. The second threshold value may be set according to experience or may be set according to the actual application scenario.

In this way, the whether wireless network coding between networks is allowed may be determined based on the load condition of the network infrastructure.

In the case that the network infrastructure allows for the wireless network coding between networks, nodes that can form an inter-network wireless network coding group may be selected among the neighbor networks of the network infrastructure.

Figure 3:
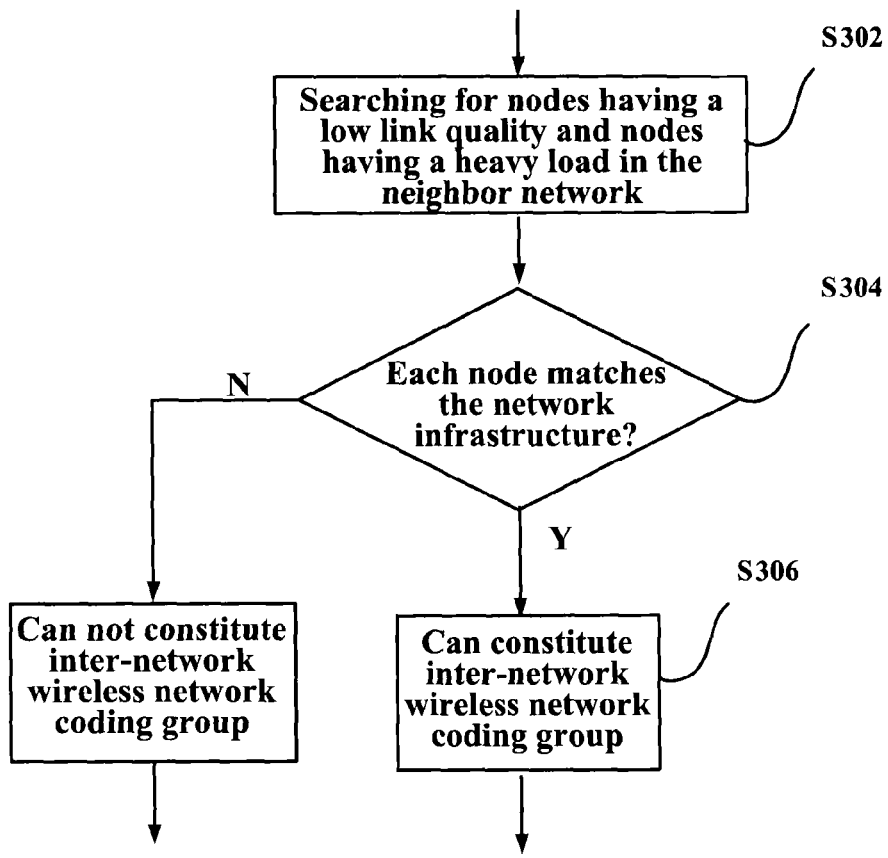
FIG. 3 is a flow chart illustrating a process of selecting from neighbor networks nodes that may constitute an inter-network wireless network coding group according to an embodiment of the disclosure.

FIG. 3 is a flow chart illustrating a process of selecting from neighbor networks nodes that may constitute an inter-network wireless network coding group according to an embodiment of the disclosure.

As shown in FIG. 3, at step S302, nodes that have a low link quality and nodes that have a heavy load are searched for in the neighbor networks.

Next, at step S304 it is determined whether each of the nodes that have a low link quality and the nodes that have a heavy load selected at step S302 matches the network infrastructure.

In particular, nodes that are within the coverage range of the network infrastructure may be found among the nodes that have a low link quality and the nodes that have a heavy load.

Next, it is determined whether the wireless technology used by a found node and the spectrum resources occupied by the found node match the wireless technology used by the network infrastructure and the spectrum resources occupied by the network infrastructure, respectively. For example, the information associated with the wireless technology used by the network infrastructure and the spectrum resources occupied by the network infrastructure may be obtained by using the resource information of the network infrastructure.

If match, the node may be determined as matching the network infrastructure.

Referring to FIG. 3, then at step S306, it is determined the node which is determined as matching the network infrastructure may be determined as a node that can be used to form the inter-network wireless network coding group.

In this way, the nodes that can constitute the inter-network wireless network coding group are selected among the neighbor networks of the network infrastructure. Since the nodes that have a low link quality and the nodes that have a heavy load in the neighbor networks of the network infrastructure are selected as the nodes that can constitute the inter-network wireless network coding group, the load condition of the nodes having a heavy load may be improved and the communication quality of the nodes having a low link quality also may be improved.

After the nodes that can constitute the inter-network wireless network coding group with the network infrastructure are selected, the inter-network wireless network coding group may be formed with the nodes and a schedule design may be performed.

Figure 4:
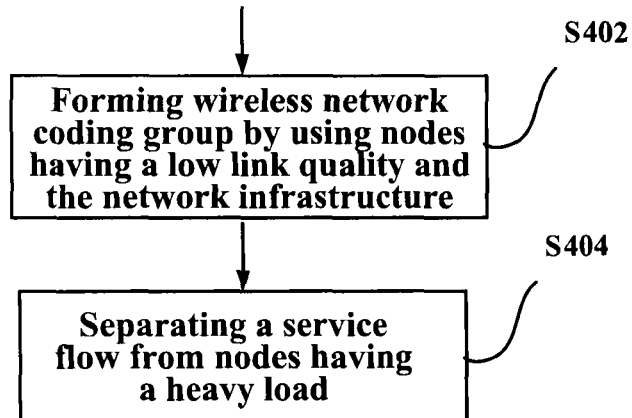
FIG. 4 is a flow chart illustrating a process of forming an inter-network wireless network coding group and performing schedule design according to an embodiment of the disclosure.

FIG. 4 is a flow chart illustrating a process of forming an inter-network wireless network coding group and performing schedule design according to an embodiment of the disclosure.

As shown in FIG. 4, at step S402 the nodes having a low link quality, together with the network infrastructure, may form a wireless network coding group, and a schedule design may be performed according to the bandwidth requirements of the nodes.

In this way, the communication quality of the nodes having a low link quality can be improved.

Next, at step S404 a service stream may be separated from the nodes having a heavy load, so that the nodes may form an inter-network wireless network coding group with the network infrastructure.

In this way, the load level of the nodes having a heavy load may be improved, and the communication quality also may be improved.

The process of forming an inter-network wireless network coding group and performing schedule design shown in FIG. 4 is merely an example and the disclosure should not be limited to this example, that is, modification may be made as appropriate. For example, the sequence of executing steps S402 and S404 is not limited to the embodiment. Optionally, steps S402 and S404 may be executed simultaneously, or step S404 may be performed before step S402.

In addition, the methods of managing wireless network coding according to the above embodiments are merely examples. Modifications can be made as appropriate. In another embodiment of the disclosure, the method of managing wireless network coding may further include, before forming the inter-network wireless network coding group, a process of forming an intra-network wireless network coding group and performing schedule design for the intra-network wireless network coding group.

Figure 18:
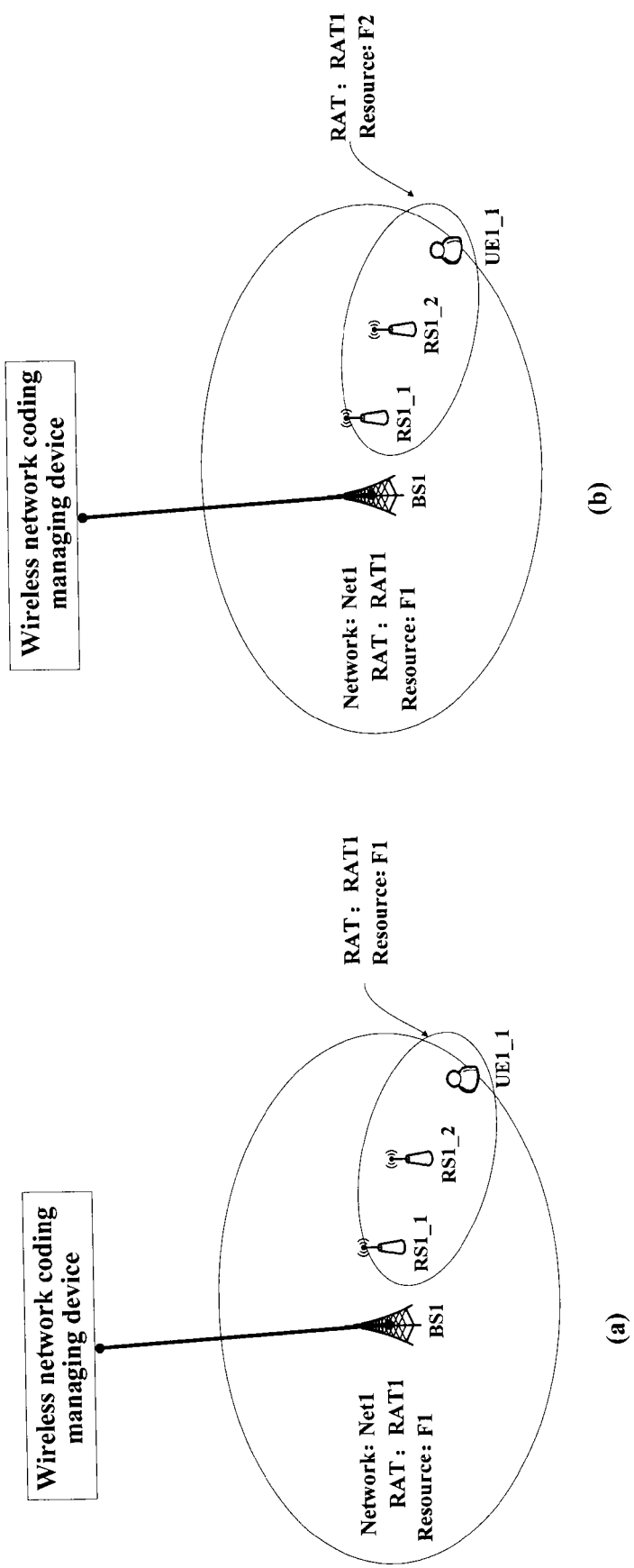
FIG. 18 is a schematic diagram illustrating intra-network wireless network coding according to the embodiment of the disclosure.

The intra-network wireless network coding indicates the case that the nodes of the wireless network coding group are from one network. FIG. 18 is a schematic diagram illustrating the wireless network coding within a network according to an embodiment. As shown in FIG. 18, the network is denoted by Net1 and utilizes the wireless access technology RAT1 and the spectrum resource F1, and includes a base station BS1, 2 relay stations RS1_1 and RS1_2 and a user UE1_1. The data exchange between the relay station RS1_1 and the user UE1_1 is performed via the forwarding of the relay station RS1_2, thus these 3 nodes may form a network coding group. After the network coding group is selected, the wireless access technology and the spectrum resources to be used by it need to be assigned. This network coding group herein uses the wireless access technology and the spectrum resources that are the same with those of Net1, as shown in FIG. 18(a). If the nodes in the wireless network coding group support the reconfiguration of the wireless technology and can find other resources, new wireless access technology and spectrum resources may be assigned for this wireless network coding group, so that it may operates while other transmission in Net1 are performed, as shown in FIG. 18(b).

Figure 5:
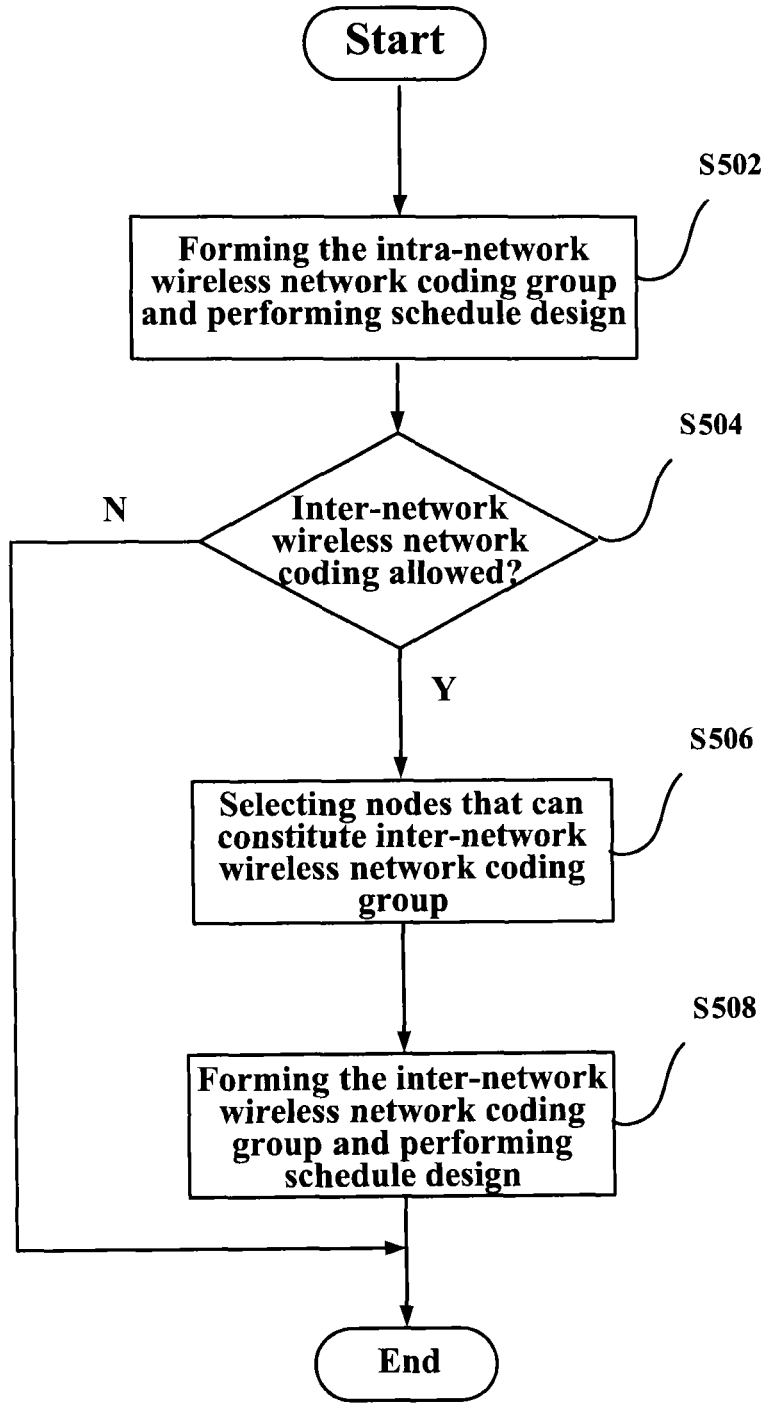
FIG. 5 is a flow chart illustrating a method of managing wireless network coding according to an embodiment of the disclosure.

FIG. 5 is a flow chart illustrating a method of managing wireless network coding according to an embodiment of the disclosure.

As shown in FIG. 5, at step S502 an intra-network wireless network coding group may be formed and a schedule design may be performed for the intra-network wireless network coding group.

Next, an inter-network wireless network coding group may be performed and a schedule design may be performed for the inter-network wireless network coding group.

In particular, as shown in FIG. 5, at step S504 it may be determined whether the network infrastructure allows for the wireless network coding between networks. If it is determined the network infrastructure allows for the wireless network coding between networks at step S504, then in step S506 the nodes that can form an inter-network wireless network coding group with network infrastructure may be selected among the neighbor networks of the network infrastructure. Next at step S508, the inter-network wireless network coding group may be formed and a schedule design may be performed.

The details of steps S504, S506, and S508 shown in FIG. 5 are similar to the steps S102, S104 and S106 shown in FIG. 1, the description of which is omitted herein for conciseness.

The method shown in FIG. 5 further includes the process of forming an intra-network wireless network coding group and performing a schedule design therefore. Therefore, in a heterogeneous network including a plurality of networks, the wireless network schedule may be achieved in an order that the intra-network schedule precedes the inter-network schedule. In this way, the efficiency of the wireless network coding and the efficiency of resource scheduling may be improved. In addition, the wireless network schedule in the order that the intra-network schedule precedes the inter-network schedule is merely a preferred embodiment of the disclosure and the disclosure should not be limited to this. Modifications may be made as required, for example, the process of forming the intra-network wireless network coding group and the process of forming the inter-network wireless network coding group may be performed in parallel, or the process of forming the intra-network wireless network coding group may be performed after the process of forming the inter-network wireless network coding group.

The process of forming the intra-network wireless network coding group and performing schedule design for the intra-network wireless network coding group may take into consideration the following 2 aspects: 1. meeting the requirements of wireless network coding; and 2. meeting the requirements of resource scheduling.

In particular, in the intra-network nodes, the wireless network coding group within the network may be formed only when the requirements of wireless network coding are met. For example, the requirements of wireless network coding may include the consistency of the uplink and downlink forwarding nodes, and/or the downlink and uplink interleaving during the uplink and downlink transmission, etc.

In addition, to meet the requirements of resource scheduling may include, for example, to meet the bandwidth requirements of the nodes, and/or to meet the communication requirements for link quality between nodes, etc.

In an embodiment of the disclosure, in the process of forming the intra-network wireless network coding group and performing schedule design, the requirements of wireless network coding may be met first, and then the requirements of resource scheduling may be met.

In particular, the nodes that meet the requirements of wireless network coding may be selected within the network first, to form the intra-network wireless network coding group, and then resources may be allocated to the links in the intra-network wireless network coding group.

Figure 6:
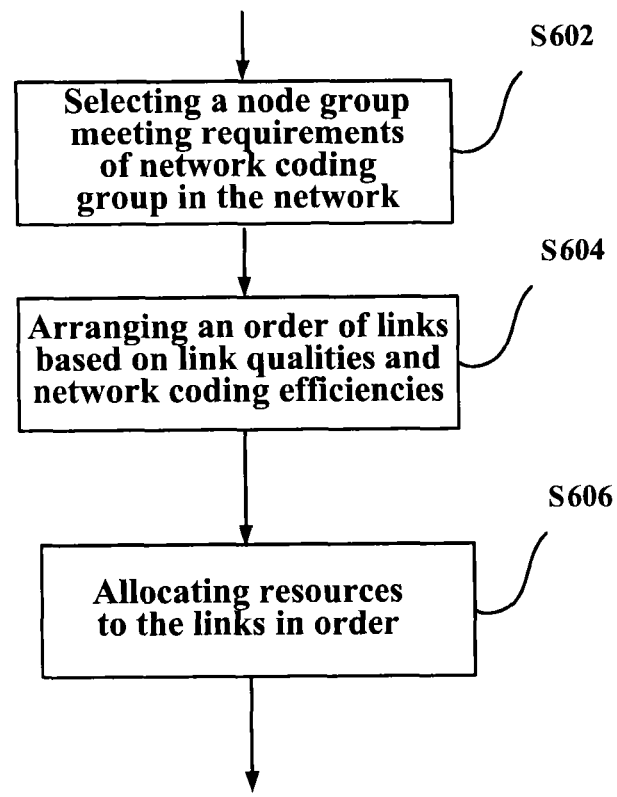
FIG. 6 is a flow chart illustrating a process of forming an inter-network wireless network coding group and performing schedule design according to an embodiment of the disclosure.

FIG. 6 is a flow chart illustrating a process of forming an inter-network wireless network coding group and performing schedule design according to an embodiment of the disclosure.

As shown in FIG. 6, at step S602 the nodes that meet the requirements of wireless network coding group may be selected within the network, as the intra-network wireless network coding group.

Next at step S604, the links in the intra-network wireless network coding group and the non-network-coding links in the networks may be arranged in an order based on the link qualities and network coding efficiencies.

In an example, the links in the intra-network wireless network coding group and the non-network-coding links in the networks may be arranged in an order based on the link qualities. And the links that have the same link quality may be arranged in an order based on the network coding efficiencies. For the non-network-coding links, the network coding efficiencies thereof may be set as 0.

In another example, the links in the intra-network wireless network coding group and the non-network-coding links in the networks may be arranged in an order based on the network coding efficiencies. And the links that have the same network coding efficiency may be arranged in an order based on the link qualities.

In yet another example, the network coding efficiency and the link quality may be assigned with different weights. For example, the link quality and the network coding efficiency and may be assigned with the weight values of 0.6 and 0.4, respectively. Then the weighted sum of the link quality and the network coding efficiency of each link is calculated and the links are arranged in an order based on the values of the corresponding weighted sums.

Referring to FIG. 6, after the links are arranged in order, resources may be allocated to the links in order at step S606.

In particular, the links may be allocated with resources based on the bandwidth requirements of the nodes, in the order determined at step S604.

In this way, the intra-network wireless network coding group is formed and the schedule design for the intra-network wireless network coding group is performed.

In the embodiment shown in FIG. 6, in the schedule design of resources after the order is arranged, the differences between the network coding links and the non-network-coding links are not taken into consideration. Here a network coding link refers to a link that establishes network coding, and a non-network-coding link refers to a link that does not establish network coding. In another embodiment, after the links are arranged in order, the resource schedule design may be performed, taking into consideration of the differences between the network coding links and the non-network-coding links.

Figure 7:
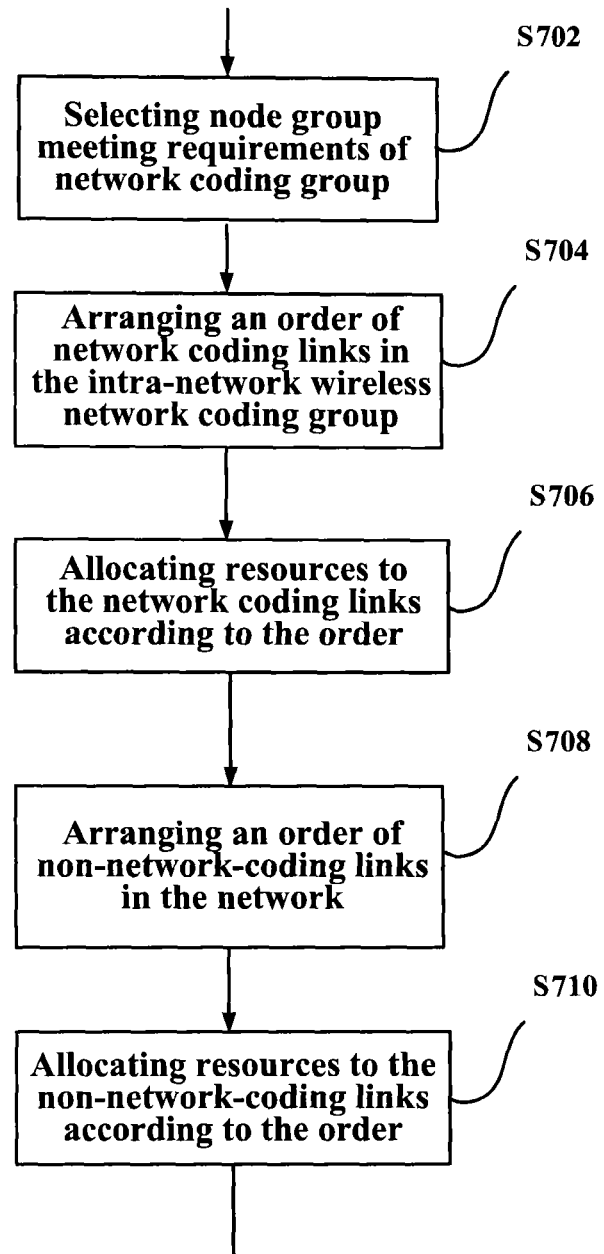
FIG. 7 is a flow chart illustrating a process of forming an inter-network wireless network coding group and performing schedule design according to an embodiment of the disclosure.

FIG. 7 is a flow chart illustrating a process of forming an inter-network wireless network coding group and performing schedule design according to an embodiment of the disclosure.

As shown in FIG. 7, at step S702 the nodes that meet the requirements of wireless network coding group may be selected within the network, as the intra-network wireless network coding group.

Step S702 in FIG. 7 is similar to step S602 in FIG. 6, the description of which is omitted herein for conciseness.

Next at step S704, the network coding links in the intra-network wireless network coding group may be arranged in an order based on the link qualities and network coding efficiencies.

Next at step S706, the network coding links may be allocated with resources in the order. In particular, the network coding links may be allocated with resources in the order determined at step S704, based on the bandwidth requirements of the nodes.

Next at step S708, the non-network-coding links in network may be arranged in an order based on the link qualities and network coding efficiencies.

Next at step S710, the non-network-coding links may be allocated with resources in the order. In particular, non-network-coding links may be allocated with resources in the order determined at step S708, based on the bandwidth requirements of the nodes.

In this way, the intra-network wireless network coding group is formed and the schedule design is performed for the links in the intra-network wireless network coding group and the non-network-coding links in the networks. In addition, in the embodiment of FIG. 7, the process of arranging the links in order based on link quality and network coding efficiency in step S704 and step S708 is similar to those in step S604 shown in FIG. 6, the description of which is omitted herein for conciseness.

In another embodiment of the disclosure, in the process of forming the intra-network wireless network coding group and performing schedule design, the requirements of resource scheduling may be met first and then the requirements of wireless network coding may be met.

Figure 8:
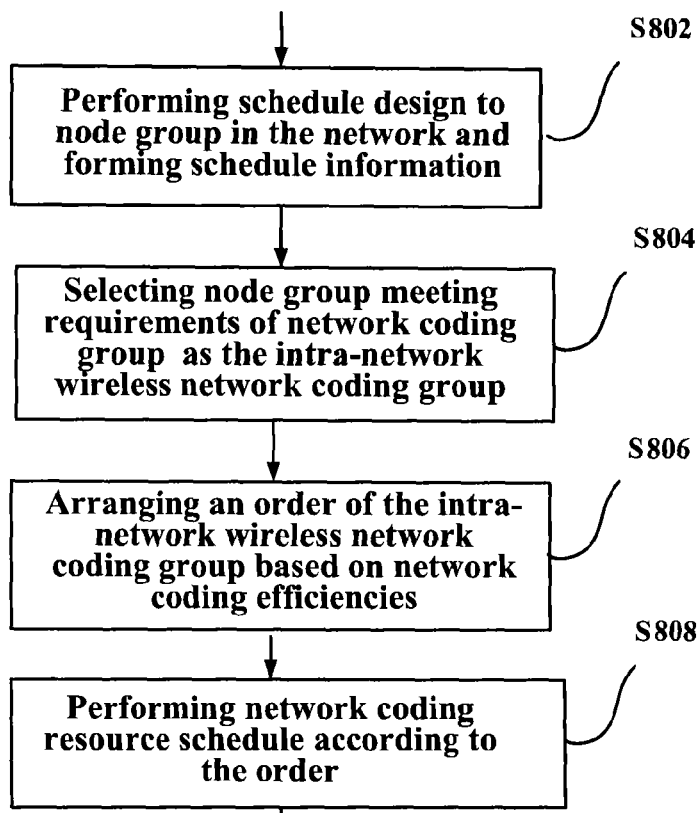
FIG. 8 is a flow chart illustrating a process of forming an inter-network wireless network coding group and performing schedule design according to an embodiment of the disclosure.

FIG. 8 is a flow chart illustrating a process of forming an inter-network wireless network coding group and performing schedule design according to the embodiment of the disclosure.

As shown in FIG. 8, at step S802 a schedule design may be performed to the nodes in the network to form the schedule information, in order to meet the requirements of resource scheduling.

Next at step S804, the node group that meets the requirements of the network coding group is selected in the network based on the schedule information, as the intra-network wireless network coding group.

For example, the node group that meets the requirements of the network coding group may be selected based on the exiting schedule information, so as to find the intra-network wireless network coding group.

Next at step S806, the nodes in the intra-network wireless network coding group may be arranged in an order based on the network coding efficiency.

Next at step S808, a resource scheduling of network coding may be performed to the intra-network wireless network coding group according to the order.

In particular, the resource scheduling of network coding may be performed to the intra-network wireless network coding group in order, to improve the scheduling efficiency and save the resource. Based on the scheduling result, the original schedule information may be adjusted to reallocate the resources that have been saved.

As an example, if the data da and db are exchanged at the nodes a and b via the node c, the transmissions are performed in a time division manner by using the full band resources. It is supposed that the original schedule information when there is no network coding includes the following: a->c transmission of da at time slot 1, c->b transmission of da at time slot 2, b->c transmission of db at time slot 3, and c->a transmission of db at time slot 4. The scheduling when the network coding is performed is adjusted to be as follows: a->c transmission of da at time slot 1, b->c transmission of db at time slot 2, c->a transmission of coded da and db at time slot 3, and the broadcast transmission of b. In this way, the time slot 4 is saved and may be used for scheduling transmission of other links. For example, the following schedule may be performed earlier. In this way, the resource utilization may be further improved.

As can be seen, in the embodiment shown in FIG. 8, the intra-network wireless network coding group is formed in an order of network coding efficiency and the schedule design is also implemented to the intra-network wireless network coding group and non-network-coding links.

Some embodiments of the disclosure provide devices, which are similar to the above method embodiments.

Figure 9:
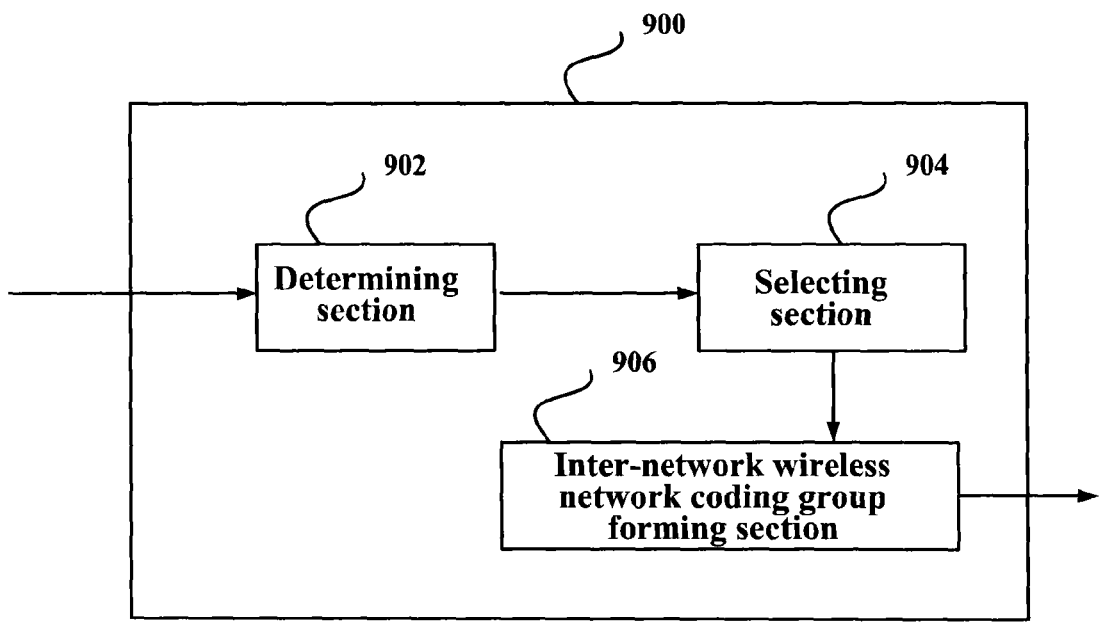
FIG. 9 is a schematic diagram illustrating a device of managing wireless network coding according to an embodiment of the disclosure.

FIG. 9 is a schematic diagram illustrating the device of managing wireless network coding according to an embodiment of the disclosure.

As shown in FIG. 9, the device of managing wireless network coding may include a determining section 902, a selecting section 904 and an inter-network wireless network coding group forming section 906.

The determining section 902 may determine whether the network infrastructure allows for wireless network coding between networks.

In particular, the determining section 902 may determine whether the network infrastructure allows for wireless network coding between networks based on the current load status of the network infrastructure.

If the determining section 902 determines that the network infrastructure allows for wireless network coding between networks, the selecting section 904 may select the nodes that can constitute the inter-network wireless network coding group among the neighbor networks of the network infrastructure.

In particular, some nodes that may bring about the reduction in the data rate or communication quality of the network (for example, the nodes having a low link quality, and/or the nodes with a heavy load, etc.) may be selected from the neighbor networks of the network infrastructure, to form the inter-network wireless network coding group, so as to improve the system capacity and the effective data rate.

The inter-network wireless network coding group forming section 906 may form the inter-network wireless network coding group and perform a schedule design.

In particular, the inter-network wireless network coding group forming section 906 may use the nodes selected by the selecting section 904, together with the network infrastructure, to form the inter-network wireless network coding group, and design a resource scheduling scheme for the wireless network coding group.

In this way, the device of managing wireless network coding according to the embodiment is implemented. In this device, an inter-network wireless network coding group may be formed between networks, and thus the system capacity and the effective data rate may be improved.

In an embodiment of the disclosure, the determining section may determine whether the network infrastructure allows for the wireless network coding between networks based on the load status of the network infrastructure.

Figure 10:
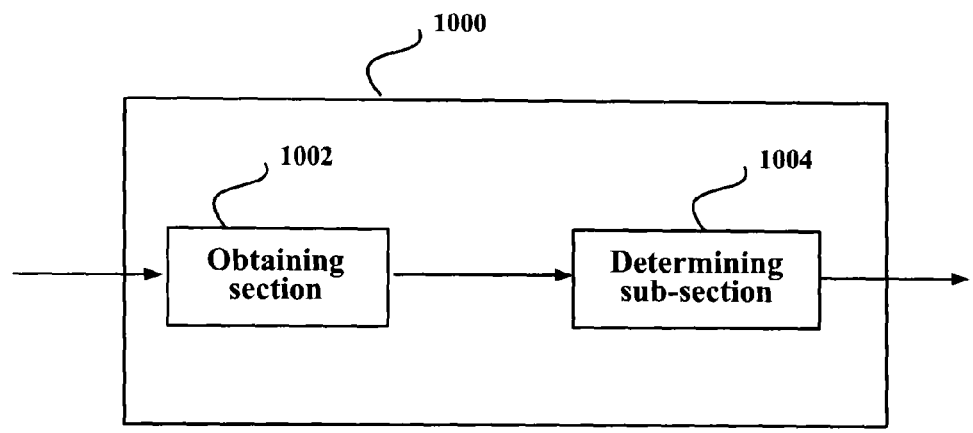
FIG. 10 is a schematic diagram illustrating a determining section according to an embodiment of the disclosure.

FIG. 10 is a schematic diagram illustrating the determining section according to an embodiment of the disclosure.

As shown in FIG. 10, the determining section may include an obtaining section 1002 and a determining sub-section 1004.

The obtaining section 1002 may obtain the resource information of the network infrastructure.

The determining sub-section 1004 may utilize the resource information of the network infrastructure obtained by the obtaining section to determine whether the wireless network coding between networks is allowed.

In a particular embodiment, the determining sub-section 1004 may use the resource information of the network infrastructure to obtain the consecutive idle time period of the network infrastructure, and if the consecutive time period exceeds a predetermined first threshold value, the determining sub-section 1004 determines that the wireless network coding between networks is allowed. The first threshold value may be set according to experience, or may be set according to the actual application scenario.

In another embodiment of the disclosure, the determining sub-section 1004 may further use the resource information of the network infrastructure to obtain the maximum load amount within the following time period, and if the maximum load amount is less than a second threshold value, the determining sub-section 1004 determines that the wireless network coding between networks is allowed. The second threshold value may be set according to experience, or may be set according to the actual application scenario.

In this way, whether the wireless network coding between networks is allowed may be determined according to the load condition of the network infrastructure.

In the case that the network infrastructure allows the wireless network coding between networks, the selecting section may select the nodes that can constitute the inter-network wireless network coding group from the neighbor networks of the network infrastructure.

Figure 11:
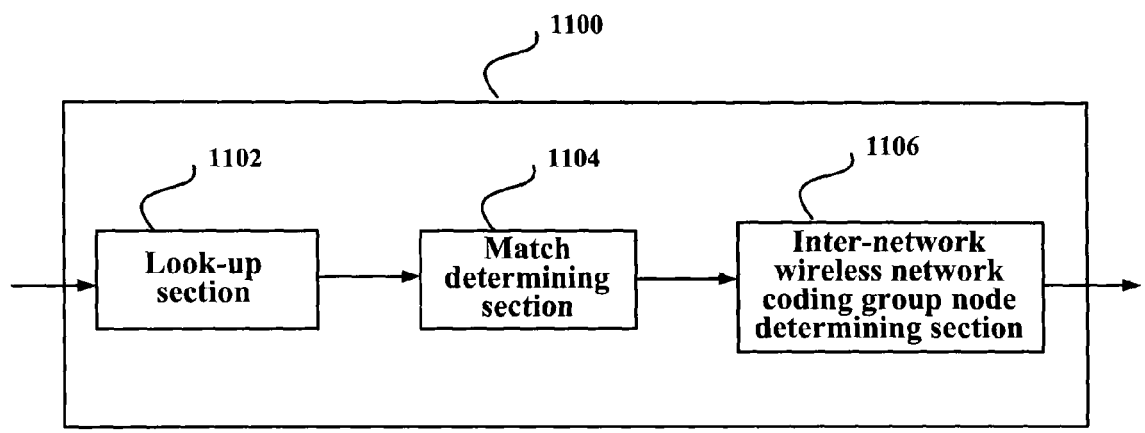
FIG. 11 is a schematic diagram illustrating a selecting section according to an embodiment of the disclosure.

FIG. 11 is a schematic diagram illustrating the selecting section according to an embodiment of the disclosure.

As shown in FIG. 11, the selecting section may include a look-up section 1102, a match determining section 1104 and an inter-network wireless network coding group node determining section 1106.

The look-up section 1102 may search for the nodes having a low link quality and the nodes having a heavy load in the neighbor networks.

The match determining section 1104 may determine whether each of the nodes having a low link quality and the nodes having a heavy load searched by the look-up section 1102 matches the network infrastructure.

In particular, the match determining section 1104 may firstly find the nodes that are within the coverage range of the network infrastructure among the nodes having a low link quality and the nodes having a heavy load.

Next, the match determining section 1104 may further determine whether the wireless technology used by a found node and the spectrum resources occupied by the found node match the wireless technology used by the network infrastructure and the spectrum resources occupied by the network infrastructure, respectively. For example, the match determining section 1104 may obtain the information associated with the wireless technology used by the network infrastructure and the spectrum resources occupied by the network infrastructure by using the resource information of the network infrastructure.

The inter-network wireless network coding group node determining section 1106 may use the nodes determined as matching the network infrastructure, as the nodes that can constitute the inter-network wireless network coding group.

In this way, the selecting section may select the nodes that can constitute the inter-network wireless network coding group together with the network infrastructure from the neighbor networks of the network infrastructure. Since the nodes having a heavy load and the nodes having a low link quality in the neighbor networks of the network infrastructure are selected as the nodes that can constitute the inter-network wireless network coding group together with the network infrastructure, the load condition of the nodes having a heavy load as well as the communication quality of the nodes having a low link quality both may be improved.

After the nodes that can constitute the inter-network wireless network coding group together with the network infrastructure are selected, the inter-network wireless network coding group forming section may further form the inter-network wireless network coding group by using these nodes and perform a schedule design.

Figure 12:
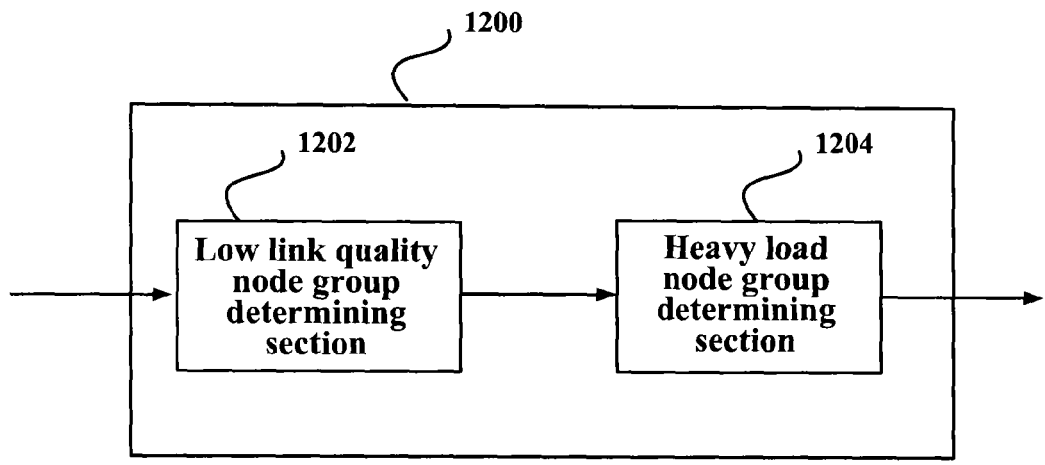
FIG. 12 is a schematic diagram illustrating an inter-network wireless network coding group forming section according to an embodiment of the disclosure.

FIG. 12 is a schematic diagram illustrating the inter-network wireless network coding group forming section according to an embodiment of the disclosure.

As shown in FIG. 12, the inter-network wireless network coding group forming section may include a low link quality node group determining section 1202 and a heavy load node group determining section 1204.

The low link quality node group determining section 1202 may use the nodes having a low link quality, among the nodes that can constitute the inter-network wireless network coding group, as well as the network infrastructure to form the wireless network coding group and perform a schedule design according to the bandwidth requirements of the nodes.

The heavy load node group determining section 1204 may separate the service flow from the nodes having a heavy load, among the nodes that can constitute the inter-network wireless network coding group, to form the inter-network wireless network coding group.

In this way, the load level of the nodes having a heavy load may be improved and communication quality may be increased.

The device of managing wireless network coding according to the embodiment is merely illustrative example. Modifications may be made thereto. In another embodiment of the disclosure, the device of managing wireless network coding may further include an intra-network wireless network coding group processing section, which may form an intra-network wireless network coding group and perform a schedule design to the intra-network wireless network coding group, before forming the inter-network wireless network coding group.

Figure 13A:
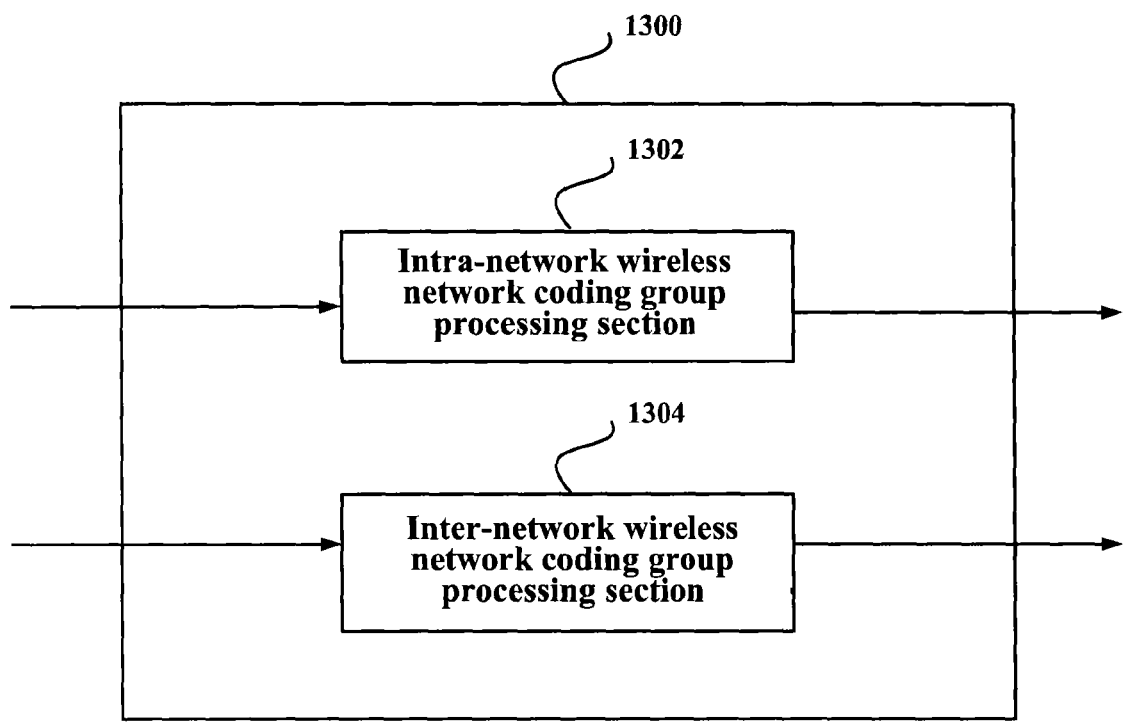
FIG. 13a is a schematic diagram showing a device of managing wireless network coding according to an embodiment of the disclosure.

FIG. 13a is a schematic diagram showing the device of managing wireless network coding according to the embodiment.

As shown in FIG. 13a, the device of managing wireless network coding may include an intra-network wireless network coding group processing section 1302 and an inter-network wireless network coding group processing section 1304.

The intra-network wireless network coding group processing section 1302 may form an intra-network wireless network coding group and perform a schedule design to the intra-network wireless network coding group.

The inter-network wireless network coding group processing section 1304 may be similar to the device shown in FIG. 9, the description of which is omitted herein for conciseness.

Figure 13B:
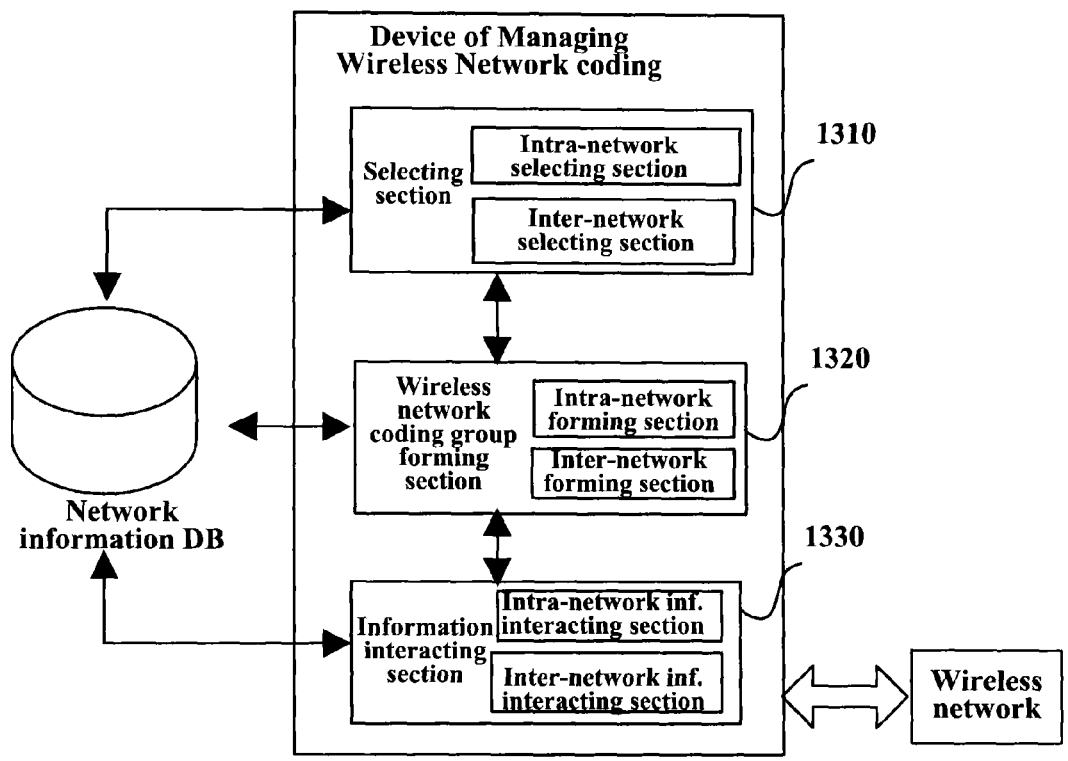
FIG. 13b is a schematic diagram showing the particular structure of the device of managing wireless network coding according to the embodiment of the disclosure.

In addition, FIG. 13b is a schematic diagram showing the particular structure of the device of managing wireless network coding according to the embodiment. As shown in FIG. 13b, the device of managing wireless network coding may include a selecting section 1310, a wireless network coding forming section 1320 and an information interacting section 1330. The selecting section 1310 may include an intra-network selecting section and an inter-network selecting section, which respectively analyze the information in a network information database with respect to the intra-network and inter-network wireless coding, to respectively select the candidate nodes that can constitute the intra-network wireless network coding group and the candidate nodes that can constitute the inter-network wireless network coding group. The wireless network coding group forming section 1320 may further include an intra-network forming section and an inter-network forming section which respectively determines the intra-network and inter-network wireless network coding groups and allocate the resources. The information interacting section 1330 may include an intra-network information interacting section and an inter-network information interacting section which distribute the scheme decision results to the wireless network. The intra-network selecting section, the intra-network forming section and the intra-network information interacting section may be included in the intra-network wireless network coding group processing section shown in FIG. 13a; and the inter-network selecting section, the inter-network forming section and the inter-network information interacting section may be included in the inter-network wireless network coding group processing section shown in FIG. 13b. Thus, the structure shown in FIG. 13b is merely a more particular example of that shown in FIG. 13, both of which are equivalent to each other in technical aspect.

As can be seen from FIG. 13b, the device of managing wireless network coding according to an embodiment of the disclosure may discover and select the nodes that can constitute the network coding groups based on the information in the network information database, allocate resources to the wireless network coding groups, and distribute the decided scheme to the wireless network for implementation.

In the devices shown in FIGS. 13a and 13b, in addition to the inter-network wireless network coding group, an intra-network wireless network coding group may be further formed. In this way, in a heterogeneous network including a plurality of networks, the device may manage the wireless network coding in an order that the intra-network schedule precedes the inter-network schedule, for example. In this way, the efficiency of the wireless network coding and the efficiency of resource scheduling may be improved.

In addition, the wireless network schedule in the order that the intra-network schedule precedes the inter-network schedule is merely a preferred embodiment of the disclosure and the disclosure should not be limited to this. Modifications may be made as required, for example, the process of forming the intra-network wireless network coding group and the process of forming the inter-network wireless network coding group may be performed in parallel, or the process of forming the intra-network wireless network coding group may be performed after the process of forming the inter-network wireless network coding group.

The intra-network wireless network coding group processing section, when forming the intra-network wireless network coding group and performing schedule design for the intra-network wireless network coding group, may take into consideration the following 2 aspects: 1. meeting the requirements of wireless network coding; and 2. meeting the requirements of resource scheduling In an embodiment of the disclosure, in the process of forming the intra-network wireless network coding group and performing schedule design, the requirements of wireless network coding may be met first, and then the requirements of resource scheduling may be met.

In particular, the intra-network wireless network coding group processing section may select the nodes that meet the requirements of wireless network coding within the network first, to form the intra-network wireless network coding group, and then allocate the resources to the links in the intra-network wireless network coding group and the non-network-coding links in the network.

Figure 14:
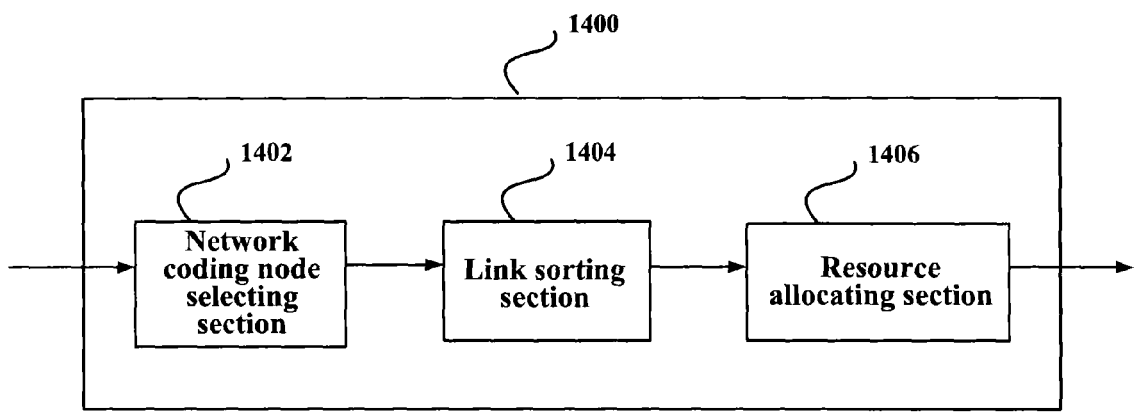
FIG. 14 is a schematic diagram illustrating an intra-network wireless network coding group processing section according to the embodiment of the disclosure.

FIG. 14 is a schematic diagram illustrating the intra-network wireless network coding group processing section according to the embodiment.

As shown in FIG. 14, the intra-network wireless network coding group processing section may include a network coding node selecting section 1402, a link sorting section 1404 and a resource allocating section 1406.

The network coding node selecting section 1402 may select the nodes that meet the requirements of wireless network coding group within the network, as the intra-network wireless network coding group.

The link sorting section 1404 may arrange in an order of the links in the intra-network wireless network coding group and the non-network-coding links in the networks based on the link qualities and network coding efficiencies The resource allocating section 1406 may allocate the resources to the links in the order based on the bandwidth requirements of the nodes.

In this way, the intra-network wireless network coding group is formed and the schedule design for the intra-network wireless network coding group and the non-network-coding links is performed.

In the embodiment shown in FIG. 14, in the schedule design of resources after the order is arranged, the differences between the network coding links and the non-network-coding links are not taken into consideration. In another embodiment, after the links are arranged in order, the resource schedule design may be performed, taking into consideration of the differences between the network coding links and the non-network-coding links.

Figure 15:
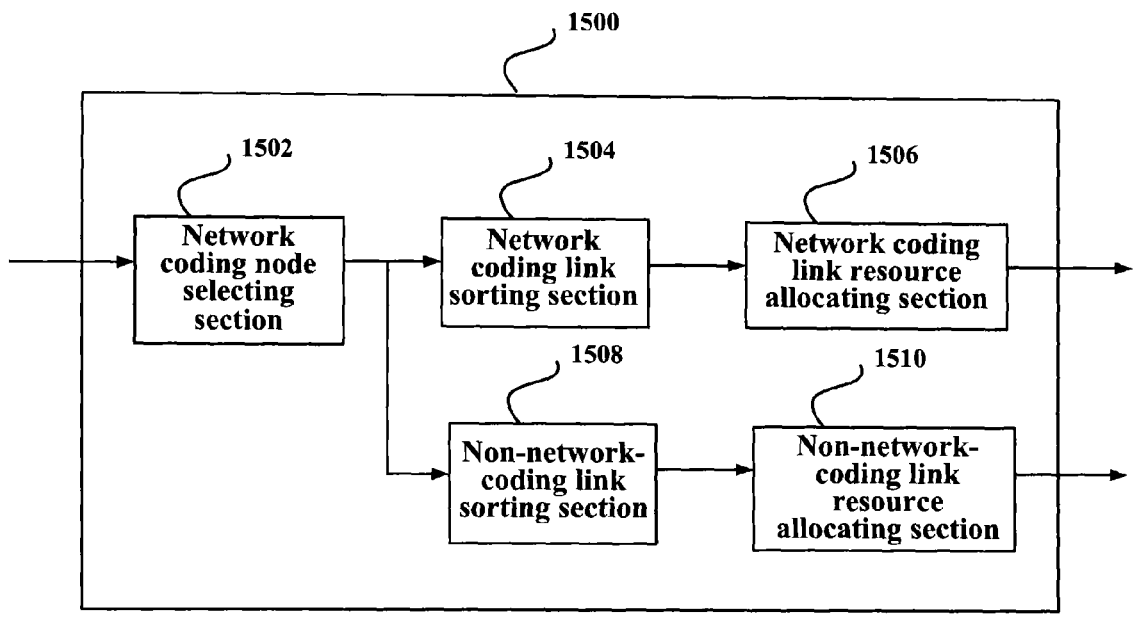
FIG. 15 is a schematic diagram illustrating an intra-network wireless network coding group processing section according to the embodiment of the disclosure.

FIG. 15 is a schematic diagram illustrating the intra-network wireless network coding group processing section according to the embodiment.

As shown in FIG. 15, the intra-network wireless network coding group processing section may include a network coding node selecting section 1502, a network coding link sorting section 1504, a network coding link resource allocating section 1506, a non-network-coding link sorting section 1508 and a non-network-coding link resource allocating section 1510.

The network coding node selecting section 1502 may be similar to the network coding node selecting section 1402 shown in FIG. 14, the description of which is omitted here for conciseness.

The network coding link sorting section 1504 may arrange an order of the network coding links in the intra-network wireless network coding group based on the link qualities and network coding efficiencies.

The network coding link resource allocating section 1506 may allocate resources to the network coding links in order, based on the bandwidth requirements of the nodes.

The non-network-coding link sorting section 1508 may arrange an order of the non-network-coding links in network based on the link qualities and network coding efficiencies.

The non-network-coding link resource allocating section 1510 may allocate resources to the non-network-coding links in order, based on the bandwidth requirements of the nodes.

In this way, the intra-network wireless network coding group is formed and the schedule design is performed for the links in the intra-network wireless network coding group and the non-network-coding links in the networks.

In another embodiment of the disclosure, in the process of forming intra-network wireless network coding group and performing a schedule design thereto, the intra-network wireless network coding group processing section may meet the requirements of resource scheduling first, before meeting the requirements of the wireless network coding.

Figure 16:
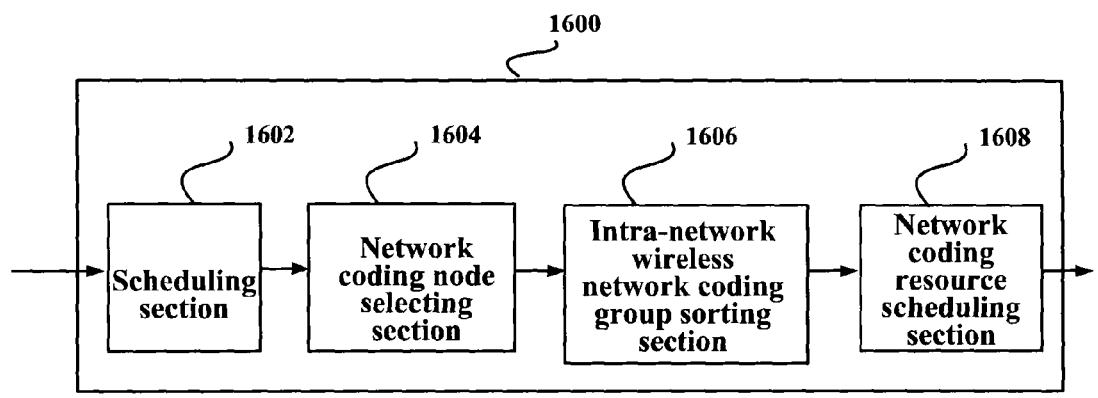
FIG. 16 is a schematic diagram illustrating an intra-network wireless network coding group processing section according to the embodiment of the disclosure.

FIG. 16 is a schematic diagram illustrating the intra-network wireless network coding group processing section according to the embodiment.

As shown in FIG. 16, the intra-network wireless network coding group processing section may include a scheduling section 1602, a network coding node selecting section 1604, an intra-network wireless network coding group sorting section 1606 and a network coding resource scheduling section 1608.

The scheduling section 1602 may perform a schedule design to the nodes in the network and form the schedule information.

The network coding node selecting section 1604 may select the node group that meets the requirements of the network coding group in the network based on the schedule information, as the intra-network wireless network coding group.

The intra-network wireless network coding group sorting section 1606 may arrange an order of the nodes in the intra-network wireless network coding group based on the network coding efficiency.

The network coding resource scheduling section 1608 may perform a resource scheduling of network coding to the intra-network wireless network coding group according to the order.

In this way, in the embodiment shown in FIG. 16, intra-network wireless network coding group processing section forms the intra-network wireless network coding group in an order of network coding efficiency and performs the schedule design to the intra-network wireless network coding group and the non-network-coding links.

Figure 19:
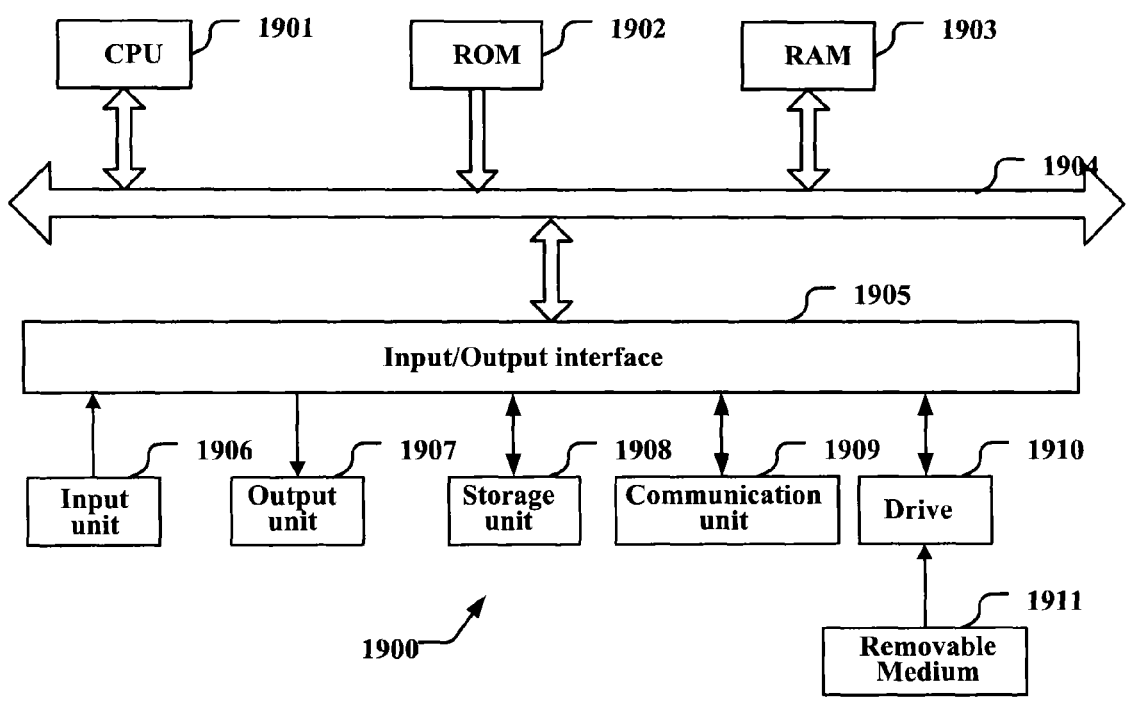
FIG. 19 is a block diagram illustrating an example of the structure of a general personal computer on which the method and/or device according to embodiments of the disclosure may be implemented.

Furthermore, it should be understood that the above embodiments and examples are illustrative, rather than exhaustive. The disclosure should not be regarded as being limited to any particular embodiments or examples stated above. In the discloser, the expressions, such as "the first" and "the second", are used. Those skilled in the art will appreciate that such expressions are used merely to differentiate the terms in literal, and should not be considered as defining the sequence or the like of the terms The components or units in the above devices can be configured with software, hardware, firmware or any combination thereof by using any appropriate means or manners known in the art, the description of which is not detailed herein. In the case of using software or firmware, programs constituting the software for realizing the above method or devices, program constituting the software can be installed to a computer with a specialized hardware structure (e.g. the general purposed computer 1900 as shown in FIG. 19) from a storage medium or a network. The computer, when installed with various programs, is capable of carrying out various functions.

In FIG. 19, a central processing unit (CPU) 1901 executes various types of processing in accordance with programs stored in a read-only memory (ROM) 1902, or programs loaded from a storage unit 1908 into a random access memory (RAM) 1903. The RAM 1903 also stores the data required for the CPU 1901 to execute various types of processing, as required. The CPU 1901, the ROM 1902, and the RAM 1903 are connected to one another through a bus 1904. The bus 1904 is also connected to an input/output interface 1905.

The input/output interface 1905 is connected to an input unit 1906 composed of a keyboard, a mouse, etc., an output unit 1907 composed of a cathode ray tube or a liquid crystal display, a speaker, etc., the storage unit 1908, which includes a hard disk, and a communication unit 1909 composed of a modem, a terminal adapter, etc. The communication unit 1909 performs communicating processing. A drive 1910 is connected to the input/output interface 1905, if needed. In the drive 1910, for example, removable media 1911 is loaded as a recording medium containing a program of the present invention. The program is read from the removable media 1911 and is installed into the storage unit 1908, as required.

In the case of using software to realize the above processing, the programs constituting the software may be installed from a network such as Internet or a storage medium such as the removable media 1911.

Those skilled in the art should understand the storage medium is not limited to the removable media 1911, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 1902 or the hard disc involved in the storage unit 1908, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

It should be noted that, the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus. In addition, unless specified, the expression "comprise(s) a . . . " does not mean that the process, method, article, or apparatus excludes other same element, in addition to the element defined by it.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

The invention claimed is:

1. A method of managing wireless network coding comprising:
   determining whether a network infrastructure allows for wireless network coding between networks, the determining further including:
      obtaining resource information of the network infrastructure; and
      determining whether the wireless network coding between networks is allowed by using the resource information of the network infrastructure, based on a load status of the network infrastructure;
   selecting, from a neighbor network of the network infrastructure, nodes usable to constitute an inter-network wireless network coding group, when the wireless network coding between networks is allowed; and
   forming the inter-network wireless network coding group and performing a schedule design.

2. The method of managing wireless network coding of claim 1, wherein the selecting of the nodes usable to constitute the inter-network wireless network coding group comprises:
   searching for nodes having a low link quality and nodes having a heavy load in the neighbor network;
   determining whether each of the nodes having a low link quality and the nodes having a heavy load matches the network infrastructure; and
   determining a matched node as a node usable to constitute the inter-network wireless network coding group.

3. The method of managing wireless network coding of claim 2, wherein the determining of whether each of the nodes having a low link quality and the nodes having a heavy load matches the network infrastructure comprises:
   determining the node as matching the network infrastructure, when a wireless technology used by the node and a spectrum resource occupied by the node are respectively consistent with a wireless technology used by the network infrastructure and a spectrum resource occupied by the network infrastructure and when the node is within a coverage range of the network infrastructure.

4. The method of managing wireless network coding of claim 1, wherein the forming of the inter-network wireless network coding group and performing the schedule design comprises:
   forming a wireless network coding group by using a node having a low link quality, in the nodes usable to constitute the inter-network wireless network coding group, together with the network infrastructure, and performing the schedule design according to bandwidth requirements of nodes; or
   separating a service flow from a node having a heavy load, in the nodes usable to constitute the inter-network wireless network coding group, to form the inter-network wireless network coding group together with the network infrastructure.

5. The method of managing wireless network coding of claim 1, further comprising:
   forming another intra-network wireless network coding group and performing another schedule design to the intra-network wireless network coding group, before forming the inter-network wireless network coding group.

6. The method of managing wireless network coding of claim 5, wherein the forming of the another intra-network wireless network coding group and the performing of the another schedule design to the intra-network wireless network coding group comprises:
   selecting a node group meeting requirements of network coding group in the network infrastructure, as the another intra-network wireless network coding group;
   arranging an order of links in the another intra-network wireless network coding group and non-network-coding links in the network infrastructure, based on link qualities and network coding efficiencies; and
   allocating resources to the links according to the order, based on bandwidth requirements of nodes.

7. The method of managing wireless network coding of claim 5, wherein the forming of the another intra-network wireless network coding group and the performing of the another schedule design to the intra-network wireless network coding group comprises:
   selecting a node group meeting requirements of network coding group in the network infrastructure, as the another intra-network wireless network coding group;
   arranging an order of network coding links in the another intra-network wireless network coding group, based on link qualities and network coding efficiencies;
   allocating resources to the network coding links in the another intra-network wireless network coding group according to the order, based on bandwidth requirements of nodes;
   arranging an order of non-network-coding links in the network infrastructure, based on link qualities; and
   allocating resources to the non-network-coding links according to the order, based on bandwidth requirements of nodes.

8. The method of managing wireless network coding of claim 5, wherein the forming of the another intra-network wireless network coding group and the performing of the another schedule design to the intra-network wireless network coding group comprises:
   performing a schedule design to a node group in the network infrastructure, to form schedule information;

selecting a node group meeting requirements of network coding group in the network infrastructure based on the schedule information, as the another intra-network wireless network coding group;

arranging an order of the another intra-network wireless network coding group based on network coding efficiencies; and performing a network coding resource schedule to the another intra-network wireless network coding group according to the order.

9. A device of managing wireless network coding comprising:

circuitry configured to:
determine whether a network infrastructure allows for wireless network coding between networks, wherein the determination further includes:
obtain resource information of the network infrastructure; and
determine whether the wireless network coding between networks is allowed by using the resource information of the network infrastructure, based on a load status of the network infrastructure;
select, from a neighbor network of the network infrastructure, nodes usable to constitute an inter-network wireless network coding group when the wireless network coding between networks is allowed; and
form the inter-network wireless network coding group and perform a schedule design.

10. The device of managing wireless network coding of claim 9, wherein the circuitry is further configured to:
search for nodes having a low link quality and nodes having a heavy load in the neighbor network;
determine whether each of the nodes having a low link quality and the nodes having a heavy load matches the network infrastructure; and
determine a matched node as a node usable to constitute the inter-network wireless network coding group.

11. The device of managing wireless network coding of claim 10, wherein the circuitry is further configured to:
determine a node as matching the network infrastructure when a wireless technology used by the node and a spectrum resource occupied by the node are respectively consistent with a wireless technology used by the network infrastructure and a spectrum resource occupied by the network infrastructure and when the node is within a coverage range of the network infrastructure.

12. The device of managing wireless network coding of claim 9, wherein the circuitry is further configured to:
form a wireless network coding group by using a node having a low link quality, in the nodes usable to constitute the inter-network wireless network coding group, together with the network infrastructure, and perform the schedule design according to bandwidth requirements of nodes; or
separate a service flow from a node having a heavy load, in the nodes usable to constitute the inter-network wireless network coding group, to form the inter-network wireless network coding group together with the network infrastructure.

13. The device of managing wireless network coding of claim 9, wherein the circuitry is further configured to:
form another intra-network wireless network coding group and perform another schedule design to the intra-network wireless network coding group, before the forming of the inter-network wireless network coding group.

14. The device of managing wireless network coding of claim 13, wherein the circuitry is further configured to:

select a node group meeting requirements of network coding group in the network infrastructure, as the another intra-network wireless network coding group;
arrange an order of links in the another intra-network wireless network coding group and non-network-coding links in the network infrastructure, based on link qualities and network coding efficiencies; and
allocate resources to the links according to the order, based on bandwidth requirements of nodes.

15. The device of managing wireless network coding of claim 13, wherein the circuitry is further configured to:
select a node group meeting requirements of network coding group in the network infrastructure, as the another intra-network wireless network coding group;
arrange an order of network coding links in the another intra-network wireless network coding group, based on link qualities and network coding efficiencies;
allocate resources to the network coding links in the another intra-network wireless network coding group according to the order, based on bandwidth requirements of nodes;
arrange an order of non-network-coding links in the network infrastructure, based on link qualities; and
allocate resources to the non-network-coding links according to the order, based on bandwidth requirements of nodes.

16. The device of managing wireless network coding of claim 13, wherein the circuitry is further configured to:
perform a schedule design to a node group the network infrastructure, to form schedule information;
select a node group meeting requirements of network coding group in the network infrastructure based on the schedule information, as the another intra-network wireless network coding group;
arrange an order of the another intra-network wireless network coding group based on network coding efficiencies; and
perform a network coding resource schedule to the another intra-network wireless network coding group according to the order.

17. A non-transitory storage medium, having embodied thereon a computer program configured to cause a computer to implement a method of managing wireless network coding, the method comprising:
determining whether a network infrastructure allows for wireless network coding between networks, the determining further including:
obtaining resource information of the network infrastructure; and
determining whether the wireless network coding between networks is allowed by using the resource information of the network infrastructure, based on a load status of the network infrastructure;
selecting, from a neighbor network of the network infrastructure, nodes usable to constitute an inter-network wireless network coding group, when the wireless network coding between networks is allowed; and
forming the inter-network wireless network coding group and performing a schedule design.

18. The device of managing wireless network coding of claim 9, wherein the wireless network coding between networks is determined to be allowed when the load status of the network infrastructure has been idle for a period of time.

19. The device of managing wireless network coding of claim 9, wherein the resource information of the network infrastructure includes information relating to a maximum load amount of the network infrastructure.

20. The device of managing wireless network coding of claim 9, wherein,
when the wireless network coding between networks is determined to not be allowed, the circuitry does not perform the selection.

\* \* \* \* \*